Aug. 26, 1941.    S. I. BOUSMAN    2,253,754
SUBMERSIBLE BEARING
Filed March 17, 1941    2 Sheets-Sheet 1

INVENTOR.
SAMUEL I. BOUSMAN
BY
Martin E. Anderson

Patented Aug. 26, 1941

2,253,754

UNITED STATES PATENT OFFICE 2,253,754

SUBMERSIBLE BEARING

Samuel I. Bousman, San Francisco, Calif., assignor to Western Machinery Company, San Francisco, Calif., a corporation of Utah Application March 17, 1941, Serial No. 383,657

5 Claims. (Cl. 308—187.1)

This invention relates to improvements in submersible bearings and has reference more particularly to a bearing intended for use with screw classifiers and similar devices.

In mining operations and other places, it is necessary to subject ores to a classifying action and for this purpose classifiers of the inclined screw type like that shown in my copending application, Serial No. 324,033, filed March 15, 1940, now Patent No. 2,241,178, are extensively employed.

Such classifiers require the lower end of the tubular inclined shaft to be submerged in the pulp during operation and it is therefore essential that this bearing shall be so constructed that it can be properly lubricated and so that grit or liquids containing abradents cannot enter the bearing.

The object of the present invention is to produce a bearing designed especially for use in connection with apparatus wherein the bearing operates in a submerged position and which shall be so constructed that it can be readily lubricated and so that the bearing will be protected against the entrance of liquid and abradent.

In order to describe this invention so that it may be readily understood, reference will be had to the accompanying drawings in which the invention has been illustrated in its preferred form, and in which.

Figure 1:
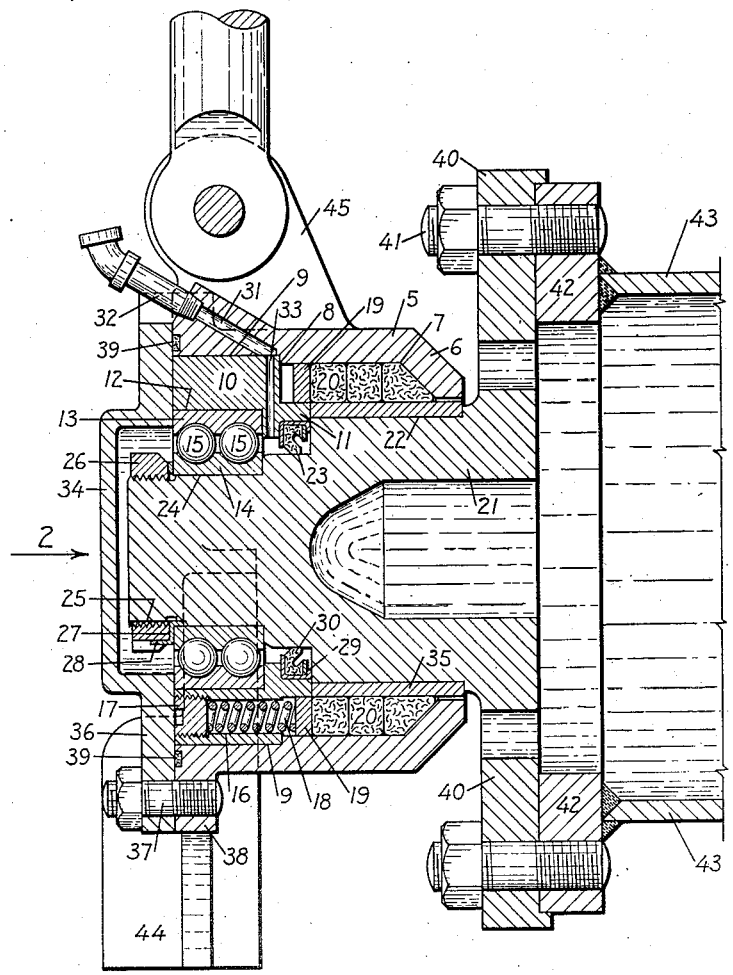
Figure 1 is a section taken on line 1—1, Figure 2.
Figure 2:
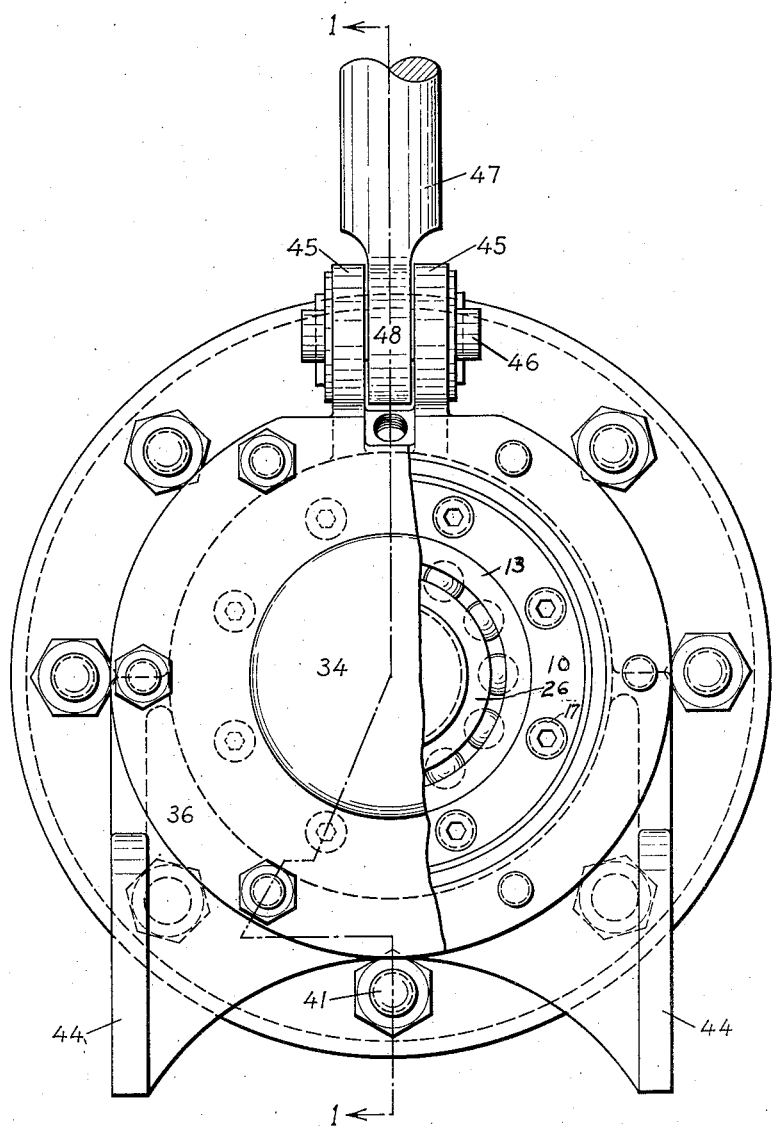
Figure 2 is an end elevation looking in the direction of arrow 2, Figure 1, a portion of the cover being removed so as to better disclose the construction.

In the drawings reference numeral 5 designates an annular body member formed from steel or other suitable material. The end of the body member shown to the right in Figure 1 and which will hereinafter be referred to as the inner end thereof, is provided with an inwardly ranging flange 6. That portion of the inner surface from the point indicated by reference numeral 7 to the point indicated by reference numeral 8 is cylindrical and of a larger diameter than the opening in the flange 6. That section of the inner surface from point 8 to the outer end of the body and which has been designated by reference numeral 9 is of a larger diameter than that portion between points 7 and 8 and forms a rabbet for the reception of a ring 10 which has a cross sectional shape like that shown clearly in Figure 1. It will be observed that ring 10 has an inwardly extending annular projection 11 and that it is provided with a rabbet whose cylindrical outer surface has been designated by reference numeral 12. Positioned in the rabbet in ring 10 is a ball bearing, the outer ball race of which has been indicated by reference numeral 13 and the inner ball race of which has been designated by reference numeral 14. The balls have been designated by reference numeral 15. This ball race is of the combined thrust and radial type. Ring 10 is provided at angularly spaced points with transverse openings 16 whose outer ends are threaded for the reception of set screws 17. Helical compression springs 18 are positioned in openings 16 and project forwarded in the manner shown in Figure 1. The front ends of the springs engage the rear surface of an abutment ring 19. The forward surface of this ring contacts the packing material 20 to which reference will hereinafter be made. Cooperating with the parts just described is a spindle which has been designated as a whole by reference numeral 21. This spindle has its outer surface formed from three cylindrical sections, one of which has been designated by reference numeral 22, another by reference numeral 23, and another by reference numeral 24. The outer end is threaded as shown at 25 for the reception of a threaded ring 26. The cylindrical portion 24 is of the proper size to receive the inner ball race 14, which is held in place by means of the threaded ring 26. This ring is locked by means of a washer 27 having one or more tongues 28 that engage in notches in the outer surface of the ring. The ring 10 has an annular recess or rabbet at its inner end in which is positioned an oil seal comprising a metal channel 29 and a leather seal member 30. This seal is so positioned that it will permit lubricant to flow inwardly but prevent liquid from flowing from the outside of the bearing into the ball bearing.

It will be observed that body member 5 is provided with an inclined opening 31, to which one end of a lubricant pipe 32 is threadedly connected. Ring 10 has an opening 33 that communicates with opening 31. When lubricant is supplied under pressure through pipe 32, it will flow through openings 31 and 33 into the ball bearing and when the cover 34 is in place, the ball bearing will be packed with lubricant, the excess lubricant escaping by the oil seal 30. The packing 20 engages a hardened steel bushing 35 and is held under compression by means of springs 18. The packing prevents grit carrying liquid from entering and this is further prevented by the grease or lubricant which is extruded through the bearing after each forced lubrication. Cover 34 is provided with a flange 36 that has openings for the reception of the stub bolts 37 that are threadedly connected with openings in flange 38 of the annular body. The inner surface of flange 36 of the cover extends over the ring 10 and over the outer end of the inner ball race 13 and serves to hold the ring 10 and the ball race in position in the annular body. The cap serves to form a grease tight chamber and in order to assure that it makes a tight seal an annular gasket 39 is inserted between the inner surface of flange 36 and the outer end of the annular body as clearly shown in the drawings. The ball bearing is of the combined radial and thrust type and therefore holds the spindle in assembled relation with the body 5. The inner end of the spindle has an outwardly extending perforated flange 40 that is provided with openings for the reception of the stud bolts 41 that have threaded engagement with the flange 42 which is autogeneously welded to the end of the tubular shaft 43.

Body member 5 is provided with two parallel downwardly extending spaced guides 44 that engage stationary guides provided for that purpose in the classifier; it is also provided with two spaced upwardly extending lugs 45 having openings for the reception of a pivot pin 46. A rod 47 has a flattened portion 48 that extends between the lugs and is connected therewith by means of the pivot 46.

From the above description and from the drawings it can be seen that the present bearing is of such construction that the ball bearings are positioned between the outer surface of the spindle and the inner surface of the annular body 5. Due to the construction shown it is practically impossible for water containing grit and other abrasives to enter the bearing because the lubricant is introduced through pipe 32 by means of a pressure device and completely fills the space between the cover and the spindle and whenever lubricant is introduced some flows outwardly past the oil seal and between the packing and the bushing 35. The bearing is held from separation by the action of the ball bearing and the threaded ring 26.

It will also be apparent that the assembly of this bearing can easily be effected because when the cover 34 is removed access is had to the interior of the annular body 5 and the threaded ring 26 can be conveniently engaged by a suitable spanner wrench. The tension of the springs 18 can also be readily adjusted whenever the cover is removed as this adjustment is effected by means of the set screws that are accessible when the cover is removed.

Bearings like the one described above and shown on the drawings can be supplied with new equipment and can also be substituted for other bearings in old equipment.

Although this bearing has been designed with special reference to operation in a submerged position, it is evident that it can be applied in other positions and its construction is such that it is suitable for almost any place where an object is to be rotatably mounted on axial trunnions.

Attention is called to the fact that flange 40 is perforated which permits mud and sand to enter shaft 43. Flange 40 may be made in the form of a spider if desired.

Having described the invention what is claimed as new is:

1. A submersible bearing comprising, in combination, an annular body having a cylindrical opening, one end of the body having an inwardly ranging flange, the other end having a rabbet, a ring positioned in the rabbet, the inner surface of the ring having a rabbet for the reception of the outer ball race of a ball bearing, a ball bearing assembly positioned in the last mentioned rabbet, the ring having a plurality of angularly spaced transverse openings, springs positioned in the openings, the outer ends of the openings having threaded plugs forming adjustable spring abutments, a spindle having its end secured within the inner ball race, the spindle having a cylindrical surface of substantially the same diameter as the opening in the inwardly ranging flange, packing material in the annular space between the spindle and the inner wall of the annular body, an abutment ring positioned between the packing and the inner end of the springs, and a removable cover secured to the open end of the annular body, said cover forming means for holding the first mentioned ring and the ball race in position.

2. A bearing in accordance with claim 1 in which the annular body and the race supporting ring have communicating openings for the introduction of lubricant.

3. A bearing in accordance with claim 1 in which an oil seal is positioned between the packing and the ball race, said seal preventing the flow of liquid into the ball bearing from the outside.

4. A submersible bearing in accordance with claim 1 in which the annular body and the race carrying ring have communicating openings for the introduction of lubricant and in which an oil seal is provided between the ball bearing and the packing, said seal being arranged to permit lubricant to flow from the ball race towards the packing while preventing flow in the opposite direction.

5. A bearing in accordance with claim 1 in which the end of the spindle that projects from the annular body has an outwardly extending flange for attachment to one end of a tubular shaft.

SAMUEL I. BOUSMAN.